(12) United States Patent
Chen et al.

(10) Patent No.: US 7,355,801 B2
(45) Date of Patent: Apr. 8, 2008

(54) IMAGE PICKUP LENS ASSEMBLY

(75) Inventors: Chun Shan Chen, Taichung (TW); Yeo Chih Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 11/539,172

(22) Filed: Oct. 5, 2006

(65) Prior Publication Data
US 2008/0043343 A1 Feb. 21, 2008

(30) Foreign Application Priority Data
Aug. 17, 2006 (TW) .............................. 095130276

(51) Int. Cl.
G02B 9/34 (2006.01)
G02B 13/18 (2006.01)

(52) U.S. Cl. ...................... 359/773; 359/708; 359/715; 359/719; 359/738; 359/740; 369/112.23

(58) Field of Classification Search ................ 359/708, 359/713–715, 719, 738–740, 773, 763, 764, 359/756, 766, 757, 755; 369/112.01, 112.23, 369/112.24
See application file for complete search history.

(56) References Cited

U.S. PATENT DOCUMENTS

2007/0081259 A1* 4/2007 Noda ......................... 359/774

* cited by examiner

Primary Examiner—Scott J. Sugarman
Assistant Examiner—Darryl J. Collins
(74) Attorney, Agent, or Firm—Banger Shia

(57) ABSTRACT

An image pickup lens assembly comprises three lens groups, from the object side to the image side: a first lens group, a second lens group, and a third lens group. The first lens group includes two lenses with refractive power, namely, a first lens with positive refractive power, and a second lens with negative refractive power. The front surface of the first lens is convex, and the rear surface of the second lens is concave. The second lens group includes a meniscus third lens with positive refractive power, the rear surface of the third lens is convex. The third lens group includes a fourth lens with negative refractive power, the front surface of the fourth lens is convex, and the rear surface of the fourth lens is aspheric. An aperture stop is located between the first lens and the second lens of the first lens group for controlling the brightness of the optical system.

18 Claims, 9 Drawing Sheets

(Embodiment 1)

f = 4.79 mm, Fno = 2.5, HFOV = 30.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.93082(ASP) | 0.878 | Plastic | 1.543 | 60.3 | 3.20 |
| 2 | | -15.3613(ASP) | 0.050 | | | | |
| 3 | Ape. Stop | Plano | 0.050 | | | | |
| 4 | Lens 2 | 7.50840(ASP) | 0.400 | Plastic | 1.632 | 23.4 | -5.29 |
| 5 | | 2.28291(ASP) | 0.904 | | | | |
| 6 | Lens 3 | -2.75243(ASP) | 0.972 | Plastic | 1.530 | 55.8 | 2.97 |
| 7 | | -1.12839(ASP) | 0.076 | | | | |
| 8 | Lens 4 | 4.94780(ASP) | 0.500 | Plastic | 1.530 | 55.8 | -3.25 |
| 9 | | 1.23863(ASP) | 0.400 | | | | |
| 10 | IR-filter | Plano | 0.300 | Glass | 1.517 | 64.1 | - |
| 11 | | Plano | 0.500 | | | | |
| 12 | Cover Glass | Plano | 0.550 | Glass | 1.517 | 64.1 | - |
| 13 | | Plano | 0.328 | | | | |
| 14 | Image | Plano | | | | | |

Table 1

| Aspheric Coefficient | | | |
|---|---|---|---|
| Surface 1 | k=-2.13902E-01 | A4=4.97171E-05 | A6=-6.61202E-03 |
|  | A8=8.61406E-03 | A10=-5.96351E-03 | - |
| Surface 2 | - | A4=2.46085E-02 | A6=-2.10849E-02 |
|  | A8=-8.32574E-03 | A10=6.10935E-03 | - |
| Surface 4 | - | A4=2.73172E-02 | A6=-2.70646E-02 |
|  | A8=-1.81070E-03 | A10=9.06502E-03 | - |
| Surface 5 | k=3.12780E-01 | A4=1.61688E-02 | A6=-1.15539E-02 |
|  | A8=1.47786E-02 | - | - |
| Surface 6 | k=1.20067E+00 | A4=-2.11056E-02 | A6=-5.00601E-02 |
|  | A8=2.13640E-02 | A10=1.05955E-02 | A12=-3.67557E-03 |
|  | A14=-5.94129E-03 | A16=1.16259E-03 | - |
| Surface 7 | k=-1.25486E+00 | A4=5.83899E-02 | A6=-6.30727E-02 |
|  | A8=1.84227E-02 | A10=-9.23044E-04 | A12=2.57091E-03 |
|  | A14=-1.06163E-03 | A16=4.94891E-05 | - |
| Surface 8 | k=-2.95976E+02 | A4=-9.19809E-02 | A6=2.61808E-02 |
|  | A8=-7.74417E-04 | A10=-6.27937E-04 | A12=1.22502E-05 |
|  | A14=2.35457E-05 | A16=-2.56910E-06 | - |
| Surface 9 | k=-8.31575E+00 | A4=-7.34470E-02 | A6=1.98206E-02 |
|  | A8=-4.47380E-03 | A10=4.75313E-04 | A12=2.96548E-06 |
|  | A14=-4.85639E-06 | A16=2.79931E-07 | - |

Table 2

(Embodiment 2)

F = 2.82 mm, Fno = 2.8, HFOV = 31.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.24329(ASP) | 0.553 | Plastic | 1.543 | 60.3 | 2.82 |
| 2 | | 5.44480(ASP) | 0.076 | | | | |
| 3 | Ape. Stop | Plano | 0.096 | | | | |
| 4 | Lens 2 | 50.0000(ASP) | 0.350 | Plastic | 1.632 | 23.4 | -4.51 |
| 5 | | 2.71669(ASP) | 0.280 | | | | |
| 6 | Lens 3 | -1.35688(ASP) | 0.588 | Plastic | 1.543 | 60.3 | 2.28 |
| 7 | | -0.74889(ASP) | 0.050 | | | | |
| 8 | Lens 4 | 1.96738(ASP) | 0.506 | Plastic | 1.530 | 55.8 | -4.29 |
| 9 | | 0.96314(ASP) | 0.200 | | | | |
| 10 | IR-filter | Plano | 0.300 | Glass | 1.517 | 64.1 | - |
| 11 | | Plano | 0.902 | | | | |
| 12 | Image | Plano | | | | | |

Table 3

| Aspheric Coefficient | | | |
|---|---|---|---|
| Surface 1 | k=-8.95661E-02 | A4=6.54410E-02 | A6=-2.42982E-01 |
| | A8=1.15019E+00 | A10=-1.92092E+00 | - |
| Surface 2 | - | A4=-1.81138E-01 | A6=7.36797E-01 |
| | A8=-7.80615E+00 | A10=1.38128E+01 | - |
| Surface 4 | - | A4=-3.97961E-01 | A6=-4.91326E-01 |
| | A8=-5.44657E+00 | A10=1.24970E+01 | - |
| Surface 5 | k=-6.59974E-01 | A4=4.71298E-02 | A6=-6.69312E-01 |
| | A8=5.68738E-01 | - | - |
| Surface 6 | k=-4.21150E+00 | A4=1.63182E-01 | A6=2.23846E-01 |
| | A8=1.69830E-01 | A10=-1.10141E+00 | A12=7.26382E-01 |
| | A14=6.11258E-01 | A16=-9.93487E-01 | - |
| Surface 7 | k=-1.00956E+00 | A4=6.48235E-02 | A6=2.68626E-01 |
| | A8=-2.62459E-01 | A10=1.55647E-01 | A12=2.94633E-01 |
| | A14=2.35652E-01 | A16=-4.93080E-01 | - |
| Surface 8 | k=-4.57184E+01 | A4=-9.19795E-02 | A6=3.72932E-02 |
| | A8=-1.10332E-02 | A10=1.31358E-03 | A12=-3.09251E-04 |
| | A14=9.04590E-04 | A16=-4.35753E-04 | - |
| Surface 9 | k=-8.09119E+00 | A4=-2.04837E-01 | A6=1.34107E-01 |
| | A8=-7.11040E-02 | A10=1.06509E-02 | A12=5.90862E-03 |
| | A14=-2.69172E-03 | A16=2.39341E-04 | - |

Table 4

|  | Embodiment 1 | Embodiment 2 |
| --- | --- | --- |
| f | 4.79 | 2.82 |
| Fno | 2.5 | 2.8 |
| HFOV | 30.1 | 31.5 |
| V2 | 23.4 | 23.4 |
| V4 | 55.8 | 55.8 |
| f1/f | 0.67 | 1.0 |
| fg1/f | 1.15 | 1.78 |
| ANG42 | -49.1 | -57.0 |
| SAG41 | -0.29 | 0.0 |
| CT2 | 0.4 | 0.35 |
| ImgH/Ds | 0.57 | 0.53 |
| TL/f | 1.23 | 1.38 |

Table 5

IMAGE PICKUP LENS ASSEMBLY

BACKGROUND OF THE INVENTION

1. Field of the Invention

The present invention relates to an optical lens assembly, and more particularly to a miniaturized image pickup lens assembly used in a camera mobile phone.

2. Description of the Prior Art

In recent years, with the popularity of camera mobile phone, the image pickup lens has been becoming thinner and thinner, and the photosensitive assembly of a general digital camera is nothing more than CCD (charge coupled device) or CMOS (Complementary Metal Oxide Semiconductor). Due to the advancement of the semiconductor technique, the pixel size of photosensitive assembly has been being reduced continuously, and the development of the miniaturized image pickup lens assembly is toward the high resolution field. Therefore, the demand for the image quality becomes increasingly urgent.

A conventional high resolution mobile phone's lens assembly usually consists of four lenses and comprises a front aperture stop, wherein the first and second lenses are two spherical lenses glued together to become a doublet for elimination of chromatic aberration. However, the disadvantages of this conventional lens assembly are as follows: firstly, the arrangement of too many spherical lenses reduces the degree of freedom of the optical system, as a result, the length of the whole optical system is difficult to be shortened. Secondly, the gluing process of the glass lenses is difficult to control.

The present invention has arisen to mitigate and/or obviate the afore-described disadvantages.

SUMMARY OF THE INVENTION

To improve the image quality of the optical system and effectively reduce the size of the lens assembly, the present invention provides a whole new four-lenses type assembly.

An image pickup lens assembly in accordance with the present invention comprises: from the object side to the image side: a first lens group, a second lens group, and a third lens group, and is further provided with an aperture stop. The first lens group includes a first lens with positive refractive power and a second lens with negative refractive power. The front surface of the first lens is convex. The rear surface of the second lens is concave. The second lens group includes a meniscus third lens with positive refractive power, and the rear surface of the third lens is convex. The third lens group includes a fourth lens with a negative refractive power, and the front surface of the fourth lens is convex. The aperture stop is located between the first lens and the second lens of the first lens group for controlling the brightness of the optical system.

Let the positive and negative lenses interlaced in a telephoto fashion can effectively reduce the length of the optical system. The front surface of the first lens provides a strong positive refractive power, and the aperture stop is located close to the object side, so that the exit pupil of the optical lens assembly will be far away from the image plane. Therefore, the light will be vertically projected onto the photosensitive assembly, this is the telecentric feature of the image side, and this feature is very important to the photosensitive power of the current solid photosensitive assembly, and can improve the photosensitivity of the photosensitive assembly while reducing the probability of the occurrence of shading. For a wide-angle optical system, the correction to the distortion and the chromatic aberration of magnification is very important, and the correction is made by arranging the aperture stop at a balanced position of the refractive power of the optical system. And the aperture stop of the image pickup lens assembly of the present invention is arranged between the first lens and the second lens, so as to achieve a balance between the properties of telecentric and wide angle view.

To effectively correct the chromatic aberration caused by the optical lens assembly, the Abbe number V2 of the second lens and the Abbe number V4 of the fourth lens satisfy the relations: V2<35, and V4>45.

Further, if the Abbe number V2 of the second lens satisfies the relation: V2<30, the resolution of the image pickup lens assembly can be further increased.

In addition, the trend of miniaturization of the optical lens assembly, and of increasing the view of angle, the radius of curvature and the size of the lenses must be reduced, and it is impossible to make such glass lenses by the use of the conventional grind method. So, the plastic materials are introduced to make lenses by injection molding, using a relatively low cost to produce high precision lenses. The surface of lens is aspheric for obtaining much more controlled variables, so as to reduce the aberration and the number of the lenses. And the inflection point formed on the lens surface contributes to a better correction of the off axis aberration.

In the image pickup lens assembly, a focal length of the optical system is f, and a focal length of the first lens is f1, and a focal length of the first lens group is fg1, they satisfy the relations:

$0.5 < f1/f < 2.0$.

$0.4 < fg1/f < 1.6$.

The length of the optical system can be reduced effectively by increasing the refractive power of the first lens. However, if the refractive power is too great, it will lead to an excessively high order aberration. And the negative refractive power of the second lens comes from the rear surface and is employed to correct the aberration generated by the system. However, if the negative refractive power is too great, the length of the optical system will be excessively long, and this is contrary to the goal of miniaturization of the optical lens assembly. The scope defined by the abovementioned relations can enable the present invention to achieve a balance between the size of the optical lens assembly and the aberration correction thereof.

The tangential angle ANG42 at the position of the maximal light height of the rear surface of the fourth lens satisfies the relation: ANG42<−40 deg, the tangential angle at the position of the maximal light height of the surface is defined as: The angle between the line perpendicular to the optical axis and the tangential line at the position the surface. When the tangential angle at the position of the maximal light height of the surface is inclined toward the image side, the tangential angle is positive, and when the tangential angle at the position of the maximal light height of the surface is inclined toward the object side, the tangential angle is negative. The height SAG41 at the position of the maximal light height of the front surface of the fourth lens satisfies the relation: SAG41<0, the height at the position of the maximal light height of the surface is defined as: The distance between the position at the maximal light height and the position at the optical axis, which projects onto the optical axis. When the height at the position of the maximal light height of the surface is inclined toward the image side, the height is positive, and when the height at the position of the maximal light height of the surface is inclined toward the object side, the height is negative. By such arrangements, the incident angle of the light with respect to the photosensitive assembly can be effectively reduced while improving the correction of the off axis aberration.

The aberration of the system can be effectively corrected and the length of the optical system can be noticeably reduced by controlling the center thickness CT2 of the second lens to satisfy the relation: CT2<0.7 mm.

The length of the whole optical system is TL, a focal length of the optical system is f, and they satisfy the relation: 0.6<TL/f<2.4.

A distance between the aperture stop and an image plane is Ds, and an image height thereof is Imgh, they satisfy the relation: 0.25<ImgH/Ds<0.75.

By such arrangements, the optical system can obtain a large angle of view.

Table 1 shows the data of the structure of the first embodiment;

Table 2 shows the aspheric data of the first embodiment;

Table 3 shows the data of the structure of the second embodiment;

Table 4 shows the aspheric data of the second embodiment; and

Table 5 is the data of the respective embodiments resulted from the equations.

DETAILED DESCRIPTION OF THE PREFERRED EMBODIMENTS

The present invention will be more clear from the following description when viewed together with the accompanying drawings, which show, for purpose of illustrations only, the preferred embodiment in accordance with the present invention.

Figure 1:
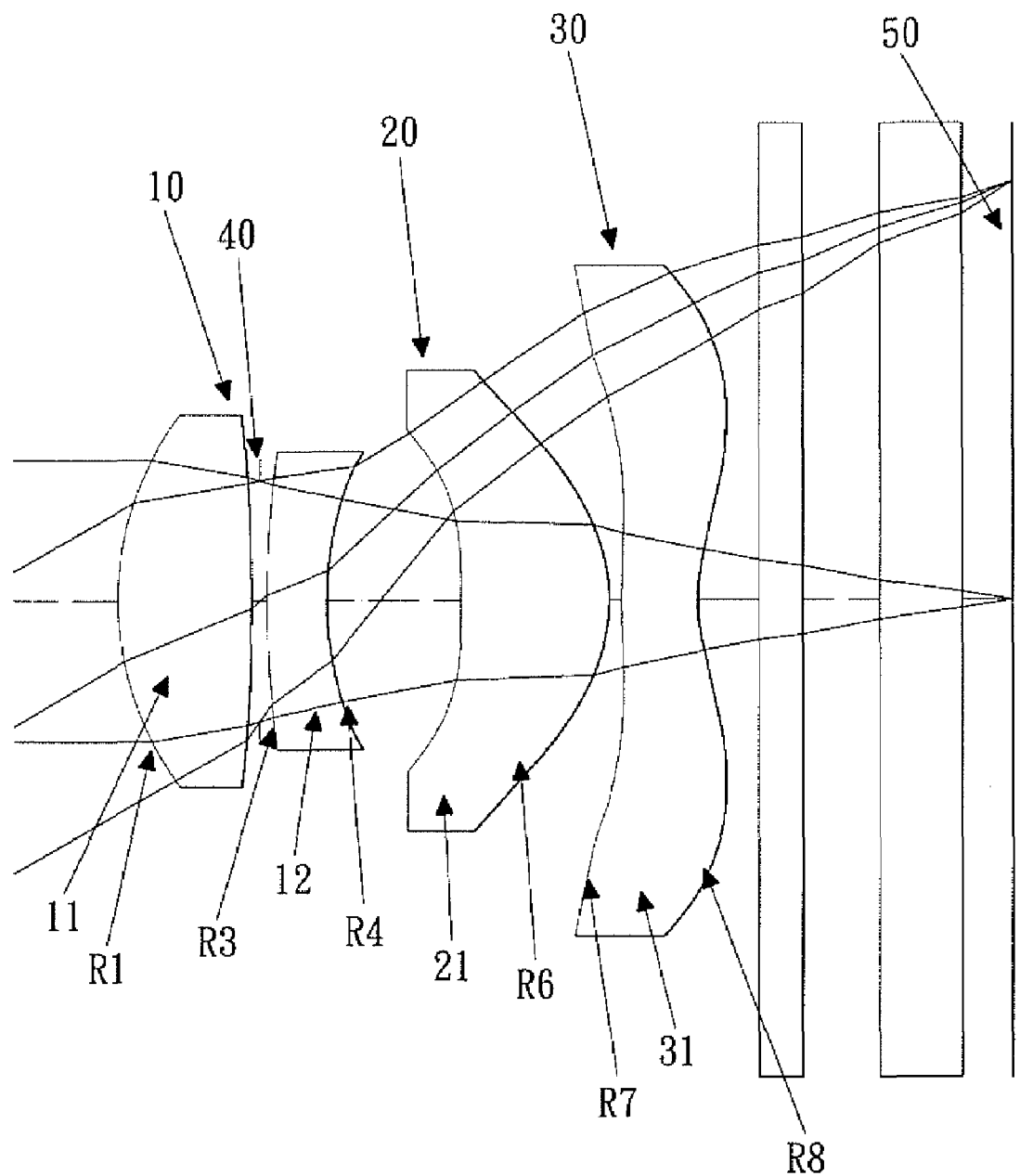
FIG. 1 shows an image pickup lens assembly in accordance with the first embodiment of the present invention.
Figure 2:
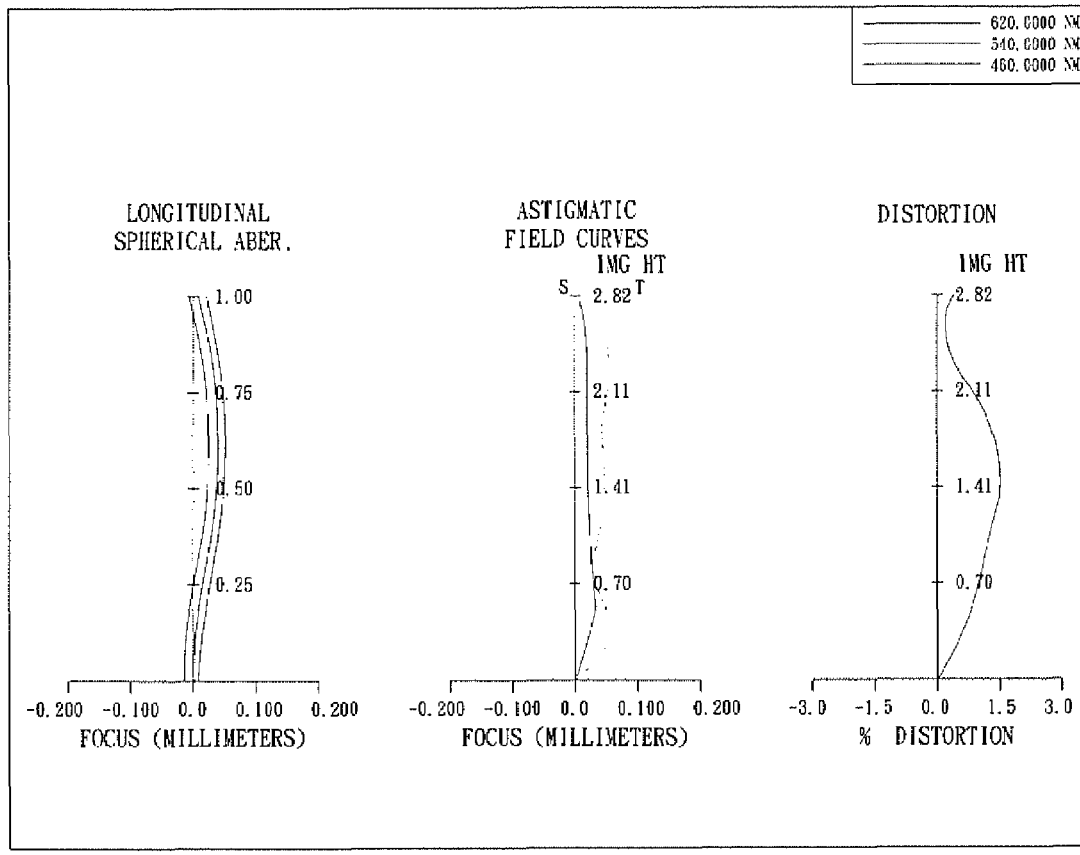
FIG. 2 shows the aberration correction of the first embodiment of the present invention.

Referring to FIG. 1, which shows an image pickup lens assembly in accordance with a first embodiment of the present invention, and FIG. 2 shows the aberration correction of the first embodiment of the present invention. The image pickup lens assembly comprises, from the object side to the image side: a first lens group 10, a second lens group 20, and a third lens group 30, and is further provided with an aperture stop 40. The first lens group 10 includes two lenses with refractive power, namely, a first lens 11 with positive refractive power, and a second lens 12 with negative refractive power. The front surface R1 of the first lens 11 is convex. The front surface R3 and the rear surface R4 of the second lens 12 are convex and concave, respectively. The second lens group 20 includes a meniscus third lens 21 with positive refractive power, and the rear surface R6 of the second lens 21 is convex. The third lens group 30 includes a fourth lens 31 with negative refractive power, and the front surface R7 of the fourth lens 31 is convex. The aperture stop is located between the first lens 11 and the second lens 12 of the first lens group 10 for controlling the brightness of the optical system.

In the image pickup lens assembly, the Abbe number V2 of the second lens is 23.4, and Abbe number V4 of the fourth lens is 55.8.

The first lens 11, the second lens 12, the third lens 21 and the fourth lens 31 are all made by plastic injection molding. Each of the surfaces of the lenses is aspheric, at least an inflection point is formed on the aspheric rear surface R8 of the fourth lens 31, and the equation of the curve of the aspheric surfaces is expressed as follows:

$$X(Y)=(Y^2/R)/(1+\text{sqrt}(1-(1+k)*(y/R)^2))+A_4*Y^4+A_6*Y^6+\ldots$$

Wherein:

X: represents the distance of the cross section of the lens;

Y: the height from the point on the curve of the aspheric surface to the optical axis;

K: represents the conical coefficients;

$A_4, A_6, \ldots$ the aspheric coefficients of the fourth and sixth order ...

The focal length of the first lens with positive refractive power is f1, the focal length of the first lens group is fg1, the focal length of the optical system is f, they satisfy the relations: f1/f=0.67, and fg1/f=1.15.

The tangential angle ANG42 at the position of the maximal light height of the rear surface of the fourth lens satisfies the relation: ANG42=−49.1 deg.

The tangential angle at the position of the maximal light height of the surface is defined as: The angle between the line perpendicular to the optical axis and the tangential line at the position the surface. When the tangential angle at the position of the maximal light height of the surface is inclined toward the image side, the tangential angle is positive, and when the tangential angle at the position of the maximal light height of the surface is inclined toward the object side, the tangential angle is negative.

The height SAG41 at the position of the maximal light height of the front surface of the fourth lens satisfies the relation: SAG41=−0.29 mm.

The height at the position of the maximal light height of the surface is defined as: The distance between the position at the maximal light height and the position at the optical axis, which projects onto the optical axis. When the height at the position of the maximal light height of the surface is inclined toward the image side, the height is positive, and when the height at the position of the maximal light height of the surface is inclined toward the object side, the height is negative.

The center thickness CT2 of the second lens is 0.4 mm.

The distance between the aperture stop and the image plane is Ds, and the image height is ImgH, they satisfy the relation: ImgH/Ds=0.57.

The length of the whole optical system is TL, the focal length of the optical lens assembly is f, and they satisfy the relation: TL/f=1.23.

The data of the structure of the first embodiment is shown in table 1, and the aspheric data is shown in table 2, wherein the units of the radius of curvature, the thickness, the focal length are expressed in mm and HFOV is half of the maximal field of view.

Figure 3:
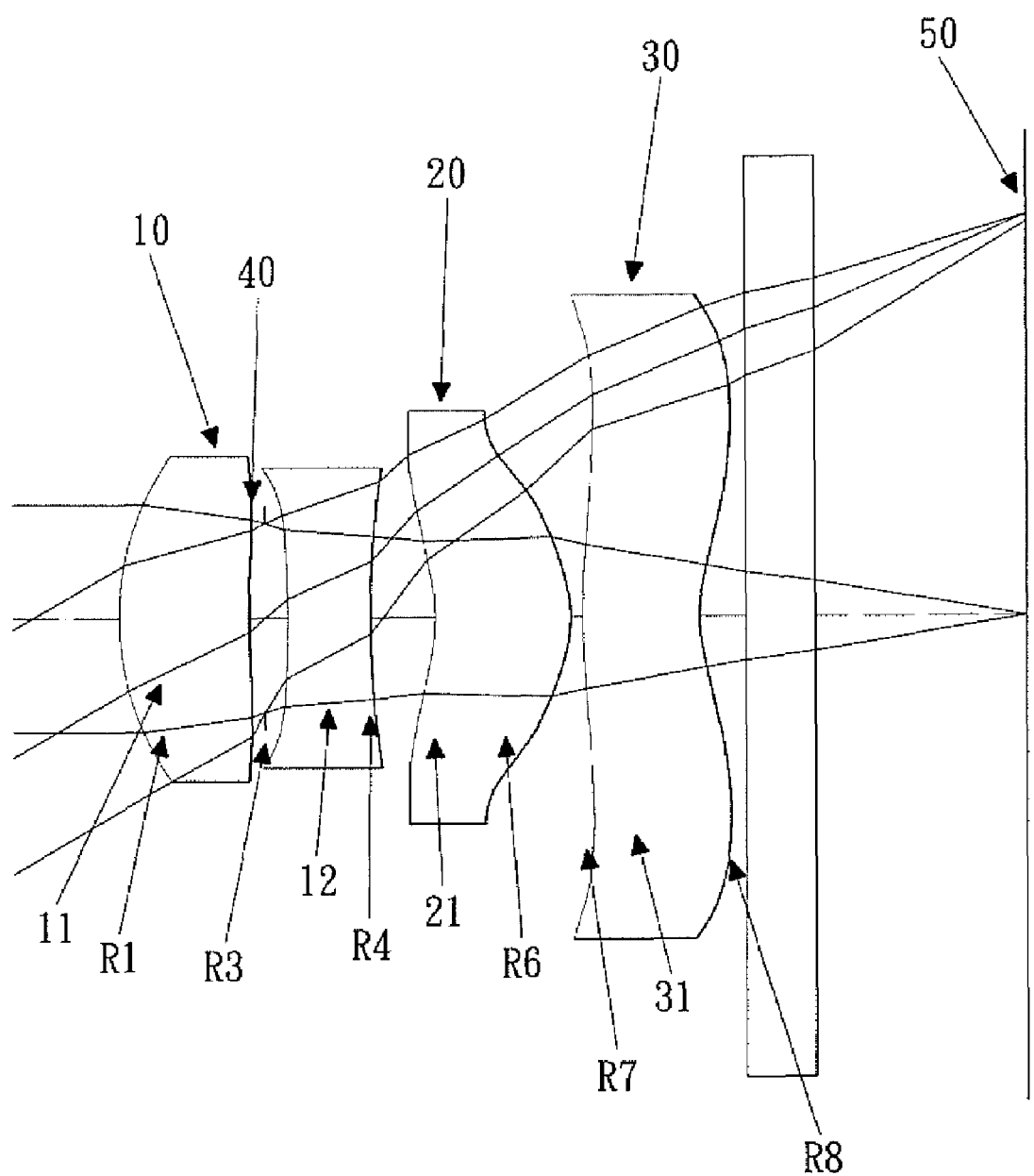
FIG. 3 shows an optical lens assembly in accordance with the second embodiment of the present invention.
Figure 4:
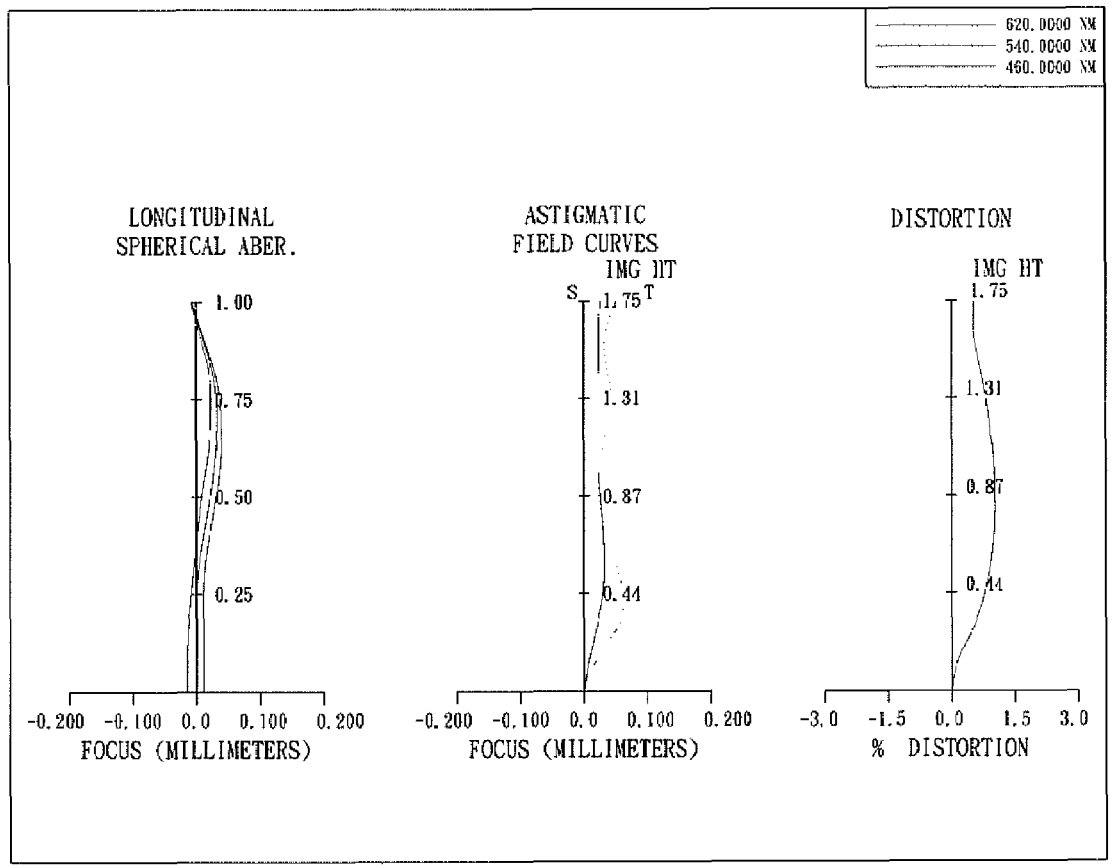
FIG. 4 shows the aberration correction of the second embodiment of the present invention.

Referring to FIG. 3, which shows an optical lens assembly in accordance with a second embodiment of the present invention, and FIG. 4 shows the aberration correction of the second embodiment the present invention. The second embodiment of the present invention is an image pickup lens assembly comprising, from the object side to the image side: a first lens group 10, a second lens group 20, and a third lens group 30, and is further provided with an aperture stop 40. The lens group 10 includes two lenses with refractive power, that is: a first lens 11 with positive refractive power, and a second lens 12 with negative refractive power. The front surface R1 of the first lens 11 is convex, and the rear surface R4 of the second lens 12 is concave. The second lens group 20 includes a meniscus third lens 21 with positive refractive power, and the rear surface R6 of the third lens 21 is convex. The third lens group 30 includes a fourth lens 31 with negative refractive power, and the front surface R7 of the fourth lens 31 is convex. The aperture stop is located between the first lens 11 and the second lens 12 of the first lens group 10 for controlling the brightness of the optical system.

In the image pickup lens assembly, the Abbe number V2 of the second lens is 23.4, and Abbe number V4 of the fourth lens is 55.8.

The first lens 11, the second lens 12, the third lens 21 and the fourth lens 31 are all made by plastic injection molding. Each of the surfaces of the lenses is aspheric, at least an inflection point is formed on the aspheric rear surface R8 of the fourth lens 31, and the equation of the curve of the aspheric surfaces of this embodiment is the same as that of the first embodiment.

The focal length of the first lens with positive refractive power is f1, the focal length of the first lens group is fg1, the focal length of the optical system is f, they satisfy the relations: f1/f=1.0, and fg1/f=1.78.

The tangential ANG42 angle at the position of the maximal light height of the rear surface of the fourth lens satisfies the relation: ANG42=−57 deg.

The definition of the tangential angle ANG42 is the same as that of the first embodiment.

The height SAG41 at the position of the maximal light height of the front surface of the fourth lens satisfies the relation: SAG41=0 mm.

The definition of the height SAG41 is the same as that of the first embodiment.

The center thickness CT2 of the second lens is 0.35 mm.

The distance between the aperture stop and the image plane is Ds, and the image height is ImgH, they satisfy the relation: ImgH/Ds=0.53.

The length of the whole optical system is TL, the focal length of the optical lens assembly is f, and they satisfy the relation: TL/f=1.38.

The data of the structure of the second embodiment is shown in table 3, and the aspheric data is shown in table 4, wherein the units of the radius of curvature, the thickness, the focal length are expressed in mm and HFOV is half of the maximal field of view.

It is to be noted that the tables 1-4 show different data of the different embodiments, however, the data of the different embodiments is obtained from experiments. Therefore, any product of the same structure is contemplated to be within the scope of the present invention even if it uses different data. Table 5 is the data of the respective embodiments resulted from the equations.

While we have shown and described various embodiments in accordance with the present invention, it is clear to those skilled in the art that further embodiments may be made without departing from the scope of the present invention.

What is claimed is:

1. An image pickup lens assembly comprising three lens groups, from the object side to the image side:
    a first lens group consisting of two lenses with refractive power, wherein the first lens of the first lens group is a positive lens, the front surface of the first lens is convex, the second lens of the first lens group is a negative lens, the rear surface of the second lens is concave;
    a second lens group including a meniscus third lens with positive refractive power, wherein a rear surface of the third lens is convex;
    a third lens group including a fourth lens with negative refractive power, wherein the front surface of the fourth lens is convex, and the rear surface of the fourth lens is aspheric;
    an aperture stop being formed in the first lens group and located between the first lens and the second lens.

2. The image pickup lens assembly as claimed in claim 1, wherein the Abbe number V2 of the second lens in the first lens group satisfies the relation: V2<35.

3. The image pickup lens assembly as claimed in claim 2, wherein the second lens of the first lens group is made of plastic material and at least one surface of the second lens is aspheric.

4. The image pickup lens assembly as claimed in claim 2, wherein the Abbe number V2 of the second lens in the first lens group satisfies the relation: V2<30.

5. The image pickup lens assembly as claimed in claim 3, wherein the front surface of the second lens in the first lens group is convex.

6. The image pickup lens assembly as claimed in claim 5, wherein the first lens of the first lens group is made of plastic material and at least one surface of the first lens is aspheric.

7. The image pickup lens assembly as claimed in claim 1, wherein the third lens and the fourth lens are made of plastic material.

8. The image pickup lens assembly as claimed in claim 7, wherein at least one surface of the third lens is aspheric.

9. The image pickup lens assembly as claimed in claim 7, wherein the Abbe number V4 of the fourth lens satisfies the relation: V4>45.

10. The image pickup lens assembly as claimed in claim 7, wherein at least an inflection point is formed on the aspheric surface of the fourth lens.

11. The image pickup lens assembly as claimed in claim 10, wherein the tangential angle ANG 42 at the position of the maximal light height of the rear surface of the fourth lens satisfies the relation: ANG42<−40 deg.

12. The image pickup lens assembly as claimed in claim 7, wherein the height SAG41 at the position of the maximal light height of the front surface of the fourth lens satisfies the relation: SAG41<0.

13. The image pickup lens assembly as claimed in claim 1, wherein the focal length of the optical system is f, and the focal length of the first lens is f1, they satisfy the relations: 0.5<f1/f<2.0.

14. The image pickup lens assembly as claimed in claim 1, wherein the focal length of the optical system is f, and the focal length of the first lens group is fg1, they satisfy the relation: 0.4<fg1/f<1.6.

15. The image pickup lens assembly as claimed in claim 1, wherein the center thickness CT2 of the second lens satisfies the relation: CT2<0.7 mm.

16. The image pickup lens assembly as claimed in claim 1, wherein the distance between the aperture stop and an image plane is Ds, and the image height is ImgH, they satisfy the relation: 0.25<ImgH/Ds<0.75.

17. The image pickup lens assembly as claimed in claim 1, wherein the length of the whole optical system is TL, the focal length of the optical system is f, and they satisfy the relation: 0.6<TL/f<2.4.

18. The image pickup lens assembly as claimed in claim 1, wherein the first lens, the second lens, the third lens and the fourth lens are all made of plastic material, and the front surface and the rear surface of the first lens, the second lens, the third lens and the fourth lens are aspheric.

* * * * *